United States Patent
Sha et al.

(10) Patent No.: US 12,488,706 B2
(45) Date of Patent: Dec. 2, 2025

(54) MODEL TEST DEVICE AND METHOD FOR CURTAIN GROUTING AND EXCAVATION OF TUNNELS IN HIGH-TEMPERATURE, WATER-RICH AND WEAK STRATA

(71) Applicant: Ocean University of China, Shandong (CN)

(72) Inventors: Fei Sha, Shandong (CN); Shijiu Gu, Shandong (CN); Xuguang Chen, Shandong (CN); Mingshuai Xi, Shandong (CN); Hao Kong, Shandong (CN); Rui Fan, Shandong (CN); Meng Bu, Shandong (CN); Liming Chen, Shandong (CN); Hang Li, Shandong (CN)

(73) Assignee: Ocean University of China, Shandong (CN)

( * ) Notice: Subject to any disclaimer, the term of this patent is extended or adjusted under 35 U.S.C. 154(b) by 478 days.

(21) Appl. No.: 18/301,268

(22) Filed: Apr. 17, 2023

(65) Prior Publication Data

US 2023/0335014 A1 Oct. 19, 2023

(30) Foreign Application Priority Data

Apr. 19, 2022 (CN) .......................... 202210407400.9

(51) Int. Cl.
*G09B 25/00* (2006.01)
*E02D 31/00* (2006.01)
(Continued)

(52) U.S. Cl.
CPC .............. *G09B 25/00* (2013.01); *E02D 31/00* (2013.01); *E02D 33/00* (2013.01); *E21D 9/003* (2013.01); *Y02E 10/10* (2013.01)

(58) Field of Classification Search
CPC ......... G09B 25/00; Y02E 10/10; E02D 31/00; E02D 33/00; E21D 9/003
See application file for complete search history.

(56) References Cited

U.S. PATENT DOCUMENTS 8,323,481 B2 * 12/2012 Dana ...................... C10G 29/04
201/37
8,365,478 B2 * 2/2013 Dana ...................... C10B 47/02
405/128.85

(Continued)

*Primary Examiner* — Jack Yip
(74) *Attorney, Agent, or Firm* — JCIPRNET

(57) ABSTRACT

This invention discloses a model test device and method for curtain grouting and excavation of tunnels in high-temperature, water-rich and weak strata, comprising weak strata simulation system, working condition simulation system, curtain grouting system, and monitoring and data acquisition system. The weak strata simulation system is the main box used to fill the soft soil. The working condition simulation system includes a high geothermal simulation system, a water pressure simulation system with stepwise loading of water pressure and volume, and a three-dimensional confining pressure simulation system with stepwise controllable loading of confining pressure. The invention can realize the whole test process simulation of grouting reinforcement and excavation of tunnels in weak strata effectively under the action of confining pressure and geothermal heat, and it has a positive reference effect on actual soft stratum tunnel curtain grouting and safe excavation.

20 Claims, 11 Drawing Sheets

(51) Int. Cl.
  *E02D 33/00* (2006.01)
  *E21D 9/00* (2006.01)

(56) References Cited

U.S. PATENT DOCUMENTS

| | | | | |
|---|---|---|---|---|
| 2003/0005650 A1* | 1/2003 | Hong | ............... | E02D 29/02 |
| | | | | 52/169.6 |
| 2015/0338549 A1* | 11/2015 | Li | ............... | G01V 20/00 |
| | | | | 703/6 |
| 2023/0060186 A1* | 3/2023 | Huang | ............... | G01M 5/0066 |
| 2023/0212074 A1* | 7/2023 | Sha | ............... | C04B 28/02 |
| | | | | 405/150.2 |

* cited by examiner

MODEL TEST DEVICE AND METHOD FOR CURTAIN GROUTING AND EXCAVATION OF TUNNELS IN HIGH-TEMPERATURE, WATER-RICH AND WEAK STRATA

CROSS-REFERENCE TO RELATED APPLICATION

This application claims the priority benefit of China application serial no. 202210407400.9, filed on Apr. 19, 2022. The entirety of the above-mentioned patent application is hereby incorporated by reference herein and made a part of this specification.

TECHNICAL FIELD

This invention refers to the field of geological disaster prevention and control in tunnel and underground engineering. Specifically, it is a model test device and method for curtain grouting and excavation of tunnels s in high-temperature, water-rich and weak strata.

BACKGROUND

China has made remarkable achievements in tunnel construction. During the "13th Five-Year Plan" period, the newly operated subway tunnel mileage has reached 3,622.8 km in China, the increase degree is approximately 184% compared with the "12th Five-Year Plan" period. In addition, a large number of projects in hydraulic tunnels, comprehensive underground pipelines, and underground chambers have also been constructed and put into operation. However, the following issues need to be solved urgently:

1. In China, the Plan of "Layout Plan for the Main Line of the Yangtze River Crossing Channel (2020-2035)" has been released in 2020, it pointed out there are current problems such as relatively small amounts of channel crossing Yangtze River, overburden of some channels, etc. By 2025, about 180 channels crossing Yangtze River will be built. By 2035, about 240 channels crossing Yangtze River will be built. In addition, the principles of "less bridges and more tunnels" and "tunnels are more suitable" should be adhered especially for key river sections such as the lower reaches of the Yangtze River. Therefore, it is urgent to enrich the tunnel excavation and construction theories in water-rich and weak strata so that the clear regulations are formulated to guide the construction of large-scale cross-sea, cross-river and wading or water-rich tunnels.

2. With the increase of tunnel construction, the problem of high geothermal has become more and more prominent. In recent years, a series of tunnel construction projects, such as the Yumomg section of the China-Laos Railway, the Dali-Lincang Railway of the China-Myanmar International Passage, and the Nige Tunnel of the Honghe-Yuan High-speed Railway in Honghe Prefecture, Yunnan Province, have encountered high geothermal issues. In the Nige Tunnel project, there are high-temperature rocks and the temperature of tunnel faces are about 50° C. on left and right lines, and the temperature of tunnel surrounding rock continues to rise with the further boring and deepening of the tunnel, whose maximum temperature can achieve 88° C. The later rock temperature remains at 85° C. steadily, and the air temperature is 51° C. Under the effect of high geothermal heat, the effects of grouting plugging and reinforcement need to be focused on emphatically.

3. The number of cross-sea and cross-river tunnels will increase continuously; they will face high water pressure problems and severe water inrush disasters. Systematic innovation and improvement are needed urgently to lay the technical foundation for the safe construction of cross-sea channels for the Bohai Strait, the Qiongzhou Strait, etc.

4. The excavation distance of tunnel is increasing constantly during the construction period. For example, the under-construction or about to start construction Shenzhen Wanghai Road Tunnel, Shantou Bay Tunnel, Jiangyin Haitai Cross-River Tunnel, etc., they all face ultralong-distance construction, the distance is all more than 10 km, and it is necessary to explore a segmented construction standard system.

5. The construction conditions of high ground stress are becoming more and more significant. For example, the main line length of the newly built Ya'an-Linzhi section is 1011 km, the total length of tunnels accounts for 83%, and the maximum horizontal principal stress attains 64 MPa.

Based on the existing practical problems mentioned above, some grouting simulation test devices have been developed domestically to simulate and control the key and difficult problems faced by tunnel and underground engineering in construction and operation periods with the grouting methods. However, there are still some existing issues of the grouting reinforcement and tunnel excavation model test system to be improved:

1. Most of previous devices have overlooked the effects of deep high-temperature geothermal activities, only considering the grouting reinforcement problems that weak strata tunnels face at normal temperatures. However, deep high-temperature factors affect the rheological properties, plugging and reinforcement performance of the slurry, on the other hand, changes in the temperature field will also affect the stress field. Aiming at the high and low temperature problems in grouting reinforcement and excavation processes of tunnels, special attention should be given.

2. Previous test devices are large in size generally, which leads to that it is difficult to obtain samples of weak media. They were closed generally, with poor visualization of the processes of grouting and excavation, and there were also problems such as complex model operation, long experimental cycles, high funding requirements, and poor experimental repeatability, making it difficult to conduct effective theoretical research on the permeability damage and instability of tunnel surrounding rocks, resulting in that the results are difficult to apply to engineering practice directly.

3. The existing model test devices mostly consider unidirectional stress loading, initial three-dimensional stress confining pressure gradient regulation is especially lacked, making it difficult to systematically study the effects of the three-dimensional confining pressure transformation on the grouting reinforcement and excavation stability of weak strata.

4. In the past, when simulating the groundwater pressure and seepage volume in the model test, artificial rainfall simulation methods (setting several sprinkler pipes above) were generally used, which can only simulate the shallow working conditions, and the water pressure and water volume gradient control are especially lacked, making it difficult to effectively simulate the confined water or pressure water, deep complex groundwater pressure and seepage volume of the strata, and it is difficult to obtain the effects of key parameters such as the critical water inrush pressure on the grouting reinforcement and excavation stability of surrounding rocks.

5. The existing model test devices mostly consider the influence of a single grouting or excavation on the stability of surrounding rocks, which is relatively one-sided, and the combination of curtain grouting reinforcement simulation and excavation stability simulation is lacked, and it is urgent to integrate curtain grouting reinforcement simulation and excavation stability simulation to realize real cycle model tests and scientific researches.

6. In the past, it was difficult to obtain the real-time response characteristics of key position multiple physical fields accurately during the grouting and excavation processes, especially under the working conditions of three-dimensional confining pressure and water pressure gradient loading to complete failure, and it is difficult to monitor and analyze key parameters such as grouting, seepage pressure, soil pressure, stress, deformation, etc. in a unified and accurate manner during the processes of grouting reinforcement and excavation.

SUMMARY

The purpose of this invention is to overcome the deficiencies of the prior art and provide a model test device and method for tunnel curtain grouting and excavation in high-temperature, water-rich and weak strata, which can realize segmental simulations of advance curtain grouting and excavation of the reinforced section in weak strata under high geothermal heat and confining pressure loading. The device adopts a prefabricated design in general, which can simulate different hydrodynamic pressures and stress loading in different directions under high geothermal heat, segmental reinforcement and excavation during the whole excavation process are realized, and it is more in line with actual engineering conditions.

To achieve the above object, this invention adopts the following technical solution:

A model test device for curtain grouting and excavation of tunnels in high-temperature, water-rich and weak strata, comprising weak strata simulation system, curtain grouting system, working condition simulation system and monitoring and data acquisition system.

The weak strata simulation system is a main box body used to fill the soft soil. The front side of the weak strata simulation system is the slurry entry surface, the back side is the slurry exit surface. The centers of slurry entry and exit surfaces are equipped with an arched excavation chamber. Several grouting holes are arranged on the outer edge of the arched excavation chamber on the slurry entry surface. Each grouting hole connects to segmented grouting device located in the weak strata simulation system, and each segmented grouting device includes a laterally extending grouting pipe. A plurality of grouting hoses corresponding to the advance curtain grouting reinforcement area before excavation connect to the side wall of the grouting pipe in parallel, and each grouting hose is provided with a plurality of grout overflow holes.

The curtain grouting system can inject slurry to the soft soil in sections in the weak strata simulation system through the grouting hole.

The working condition simulation system includes a high geothermal simulation system, a water pressure simulation system, and a three-dimensional confining pressure simulation system. The high geothermal simulation system can heat the soft soil in the weak strata simulation system. The water pressure simulation system can inject water into the soft soil in the simulation system. The three-dimensional confining pressure simulation system can exert pressure on the soft soil in the weak strata simulation system, and the monitoring and data acquisition system is used for monitoring and collecting relevant test parameters of the soft soil in the weak strata simulation system.

Further, the weak strata simulation system consists of a grid frame on the slurry inlet surface, a grid frame on the slurry outlet surface, side steel grid frames, a top steel grid frame, connecting steel parts, acrylic boards and a test platform. The number of side steel grid frames is two and they are distributed on left and right sides. The grid frame on the slurry inlet surface, the grid frame on the slurry outlet surface, the side steel grid frame and the top steel grid frame are all steel grid frames welded by steel plates along the vertical and horizontal directions. The bottom of the steel grid frame connects to the test platform by bolts.

The number of the connecting steel parts is two, and they connect to the top surface of the grid frame on the slurry inlet surface and the grid frame on the slurry outlet surface by bolts respectively, and the left and right ends of the connecting steel parts connect to the side steel grid frame frames by bolts respectively. The top surface steel grid frame is placed on the soft soil.

The number of the acrylic boards is four, which are placed on the inner side of the grid frame on the slurry inlet surface, the grid frame on the slurry outlet surface, and the steel frames on the left and right sides respectively. The acrylic board placed on the rear side of the grid frame on the slurry inlet surface is provided with arched excavation chambers and grouting holes. The acrylic board placed on the back side of the grid frame on the slurry outlet surface is provided with an arched excavation chamber. The acrylic boards placed behind the steel frames on the left and right sides are provided with water inlet holes, drainage holes and sensor data cable lead-out holes respectively.

Further, the curtain grouting system includes a high-pressure pumping pipe, a slurry air compressor, a grouting air pressure regulator, a grouting pump and a mixing tank. The high-pressure pumping pipe connects to the mixing tank, the grouting pump and the grouting hole in the weak strata simulation system sequentially. The air compressor connects to the slurry pressure regulator.

Further, the high geothermal simulation system includes several stainless-steel heating rods, and the adjustable temperature of the stainless-steel heating rods is between 35° C. and 90° C. The stainless-steel heating rod is fixed on the inner surface of the side steel grid frame frames vertically and embedded in the soft soil.

Further, the water pressure simulation system includes a water storage pressure tank and a water pressure simulation air compressor. The water storage pressure tank has good airtightness, and an air inlet is arranged at the center of the upper end of the tank and a barometer is arranged to monitor the air pressure in the tank. The air inlet of the water storage pressure tank connects to the air pressure regulator of the water pressure simulation air compressor. The lower end of the water storage pressure tank is provided with a liquid discharge port at a distance from the bottom of the tank. The liquid discharge port of the water storage pressure tank connects to the water inlet hole of the weak strata simulation system.

Further, the three-dimensional confining pressure simulation system includes a hydraulic station and multiple loading units. The loading units are distributed on the top, left, right, front and rear of the weak strata simulation system, and each loading unit includes hydraulic cylinders and loading plates. The hydraulic cylinders are arranged on a steel grid frame, and the loading plate is located in the weak strata simulation system and it contacts with soft soil. The hydraulic cylinders connect to the hydraulic station through a hydraulic pipeline.

Further, the monitoring and data acquisition system includes temperature sensors, grouting flow sensors, dynamic water flow sensors, grouting pressure sensors, dynamic water pressure sensors, formation pressure sensors, displacement sensors, high-definition cameras, paperless recorders, and data analyzers. The temperature sensors are buried inside the weak strata simulation system. The grouting flow sensor connects to the curtain grouting system. The grouting pressure sensor is placed before the grouting flow sensor. The dynamic water flow sensor connects to a water pressure simulation system. The dynamic water pressure sensor is placed before the dynamic water flow sensor. The formation pressure sensors and displacement sensors are embedded in the weak strata simulation system filled with soft soil. A total of two paperless recorders are located in the curtain grouting system parallel-connected to grouting flow sensor, grouting pressure sensor and water pressure simulation system parallel-linked with dynamic water flow sensor and dynamic water pressure sensor.

Further, an arched cover is provided outside the arched excavation chamber, and the arched covers are connected by bolts. During the grouting process, the bolts are buried in the soil arched cover to play a sealing role. During the excavation process, the arched cover is removed and the arched excavation limit plate is placed. The arched excavation limiting plate is a welded arched steel plate.

Further, the connecting steel parts are formed by two vertical welding steel plates, and a plurality of triangular ribs are arranged evenly along the length direction of a fixed connecting piece.

A model method for curtain grouting and excavation of tunnels in high-temperature, water-rich and weak strata, using the model test device described in this invention to carry out the test method, comprising the following steps:

(1) Before the test, the test design should be carried out first, and the position of the monitoring components in the soil and weak stratum simulation system should be designed according to the actual needs and conditions.

(2) Before injecting to the medium, the hydraulic cylinders with the loading plate are hollowed out inside each grid surface through the steel frame, and then the weak strata simulation system is assembled except the top steel frame according to the demand, and the test should be carried out on the weak strata simulation system. Lay PVC film in the space to prevent water seepage in the connection gap.

(3) The monitoring elements should be arranged promptly during the injection of the medium. stainless-steel heating rods, temperature sensors, formation pressure sensors, displacement sensors, etc. should be embedded in advance according to the designed plan. The monitoring and data acquisition system should be debugged promptly. The stainless-steel heating rods constitute the high-temperature simulation system, and then the water pressure simulation system is installed.

(4) After the filling of the injected medium is completed and the test equipment is assembled and connected, a hydraulic test should be carried out first to check whether there are obvious gaps between the entire device and the connection positions of various places, so as to ensure that hidden dangers can be checked in time and ensure that the later tests are carried out normally. Data such as seepage velocity and pressure field in the medium before being injected can be obtained.

(5) After the hydraulic test, the stainless-steel heating rod is heated before the ground stress is loaded each time, and then turn off the power supply of the stainless-steel heating rod after it reaches the specified temperature. Afterwards, three-dimensional confining pressure loads are applied according to the designed ground stress, and real-time temperature field and stress field at key positions are recorded in order to verify whether the confining pressure loading complies with the expected requirements of the test. During the process of confining pressure loading, it should be confirmed that the power supply of the stainless-steel heating rod is turned off.

(6) The curtain grouting system connects to the grouting hole of the weak strata simulation system for grouting. During the grouting process, the parameters of the high geothermal simulation system, water pressure simulation system, and three-dimensional confining pressure simulation system are kept stable, and the output data of the monitoring components are paid attention and recorded in time. During the grouting process, a multi-stage grouting test is carried out. After each stage of the grouting test, the arched cover can be opened after the output data of every monitoring element remains stable, and the excavation limit plate is placed to guide the excavation. During the excavation process, the excavation distance and the monitoring output data of the data acquisition system are recorded continuously. When the output data of the monitoring components is stable, the hydraulic gelling grouting material is injected again in the excavation section of the tunnel. After excavation, the tunnel vault, side walls, tunnel face, etc. shall be reinforced by grouting, and the above grouting and excavation steps shall be repeated again, and the impact of the subsequent excavation process on the previous reinforcement section shall be recorded.

(7) After the entire tunnel excavation is completed, the continuous and stable three-dimensional loading of the three-dimensional confining pressure simulation system is maintained, and the output flow rate of the water pressure simulation system is increased gradually, and the water supply pressure increases until the water inrush and mud inrush of the simulation tunnel happen. The output data of the monitoring components are recorded during the whole test process in real-time.

After the test is over, the simulation test system is disassembled to cut the injected medium, the distribution of slurry veins in different sections are observed directly, and then the test data is analyzed. The reinforcement effects of slurry on weak strata are recorded and summarized under the high temperature three-dimensional confining pressure and controllable water pressure gradient loading.

Compared with the prior art, the beneficial effects achieved by this invention are as follows:

1. The invention can realize segmental advance curtain grouting simulation and excavation simulation of water-rich weak strata under high geothermal and confining pressure loading. The overall device adopts a prefabricated design, which can simulate different hydrodynamic pressures and stress loading in different directions under high geothermal conditions, and segmental reinforcement and excavation are carried out throughout the excavation process, which is more accorded with actual engineering conditions.

2. The model test device and method for curtain grouting and excavation of tunnels in high-temperature, water-rich and weak strata in this invention, the three-dimensional size of the model test device is suitable for taking samples effectively. The weak strata simulation system is composed of steel frames on every side and visualized acrylic boards.

Each frame is connected by high-strength bolts, which can realize the visualization of grouting and excavation process. It can be assembled and disassembled according to different requirements, the model is easy to operate, the test period is short, and the steel frame can be recycled and reassembled for testing with good repeatability and good economic benefits.

3. The model test device and method for curtain grouting and excavation of tunnels in high-temperature, water-rich and weak strata in this invention, the influence of high-temperature geothermal field on segmental curtain grouting reinforcement and excavation of tunnel is introduced, and controls the temperature of the weak strata simulation system The working condition simulations of tunnel grouting reinforcement and excavation stability in soft ground under high geothermal conditions have been realized, which provides data support and basis for the subsequent influence of temperature field on actual working conditions.

4. The model test device and method for curtain grouting and excavation of tunnels in high-temperature, water-rich and weak strata in this invention. A multi-dimensional stress-loaded three-dimensional confining pressure simulation system is used to focus on the adjustable gradient loading of three-dimensional stress confining pressure, whose actual conditions can be simulated effectively in soft strata. The three-dimensional in-situ stress confining pressure that may be encountered during the grouting reinforcement and excavation provides a solid foundation for the systematic study of the influence mechanism of the deep transformed three-dimensional confining pressure on the grouting reinforcement and excavation stability of weak strata.

5. The model test device and method for curtain grouting and excavation of tunnels in high-temperature, water-rich and weak strata in this invention, a water pressure simulation system is developed and applied, and the water pressure and water volume are loaded gradually to simulate the confined water, complex water pressure and water seepage effectively in deep parts of water-rich weak strata. And the water pressure simulation system can provide a relatively large water pressure, which is conducive to testing and evaluating the grouting reinforcement effect of surrounding rock under different water pressure and water volume conditions, and it is conducive to describe the stratum water conditions such as critical water pressure of water inrush and gushing after curtain grouting reinforcement quantitatively. It is beneficial to obtain the mechanism of the key parameters such as the critical water pressure of water inrush on the grouting reinforcement and excavation stability of tunnel surrounding rock.

6. The model test device and method for curtain grouting and excavation of tunnels in high-temperature, water-rich and weak strata in this invention, which makes up for the combination shortcomings of the curtain grouting reinforcement and excavation stability of surrounding rock. The model test device and test method combining grouting simulation and excavation stability simulation have laid a solid foundation for the entire process of real cycle model test and scientific research of the combination of curtain grouting reinforcement and excavation stability.

7. The model test device and method for curtain grouting and excavation of tunnels in high-temperature, water-rich and weak strata in this invention, during tunnel excavation, a limit plate is used to guide the excavation to ensure that the shape of the excavated tunnel is more accorded with the actual stress distribution, and segmental grouting is adopted. The device is reinforced and excavated by segmental grouting, which also ensures the consistency between the model test conditions and the engineering conditions.

Figure 1:
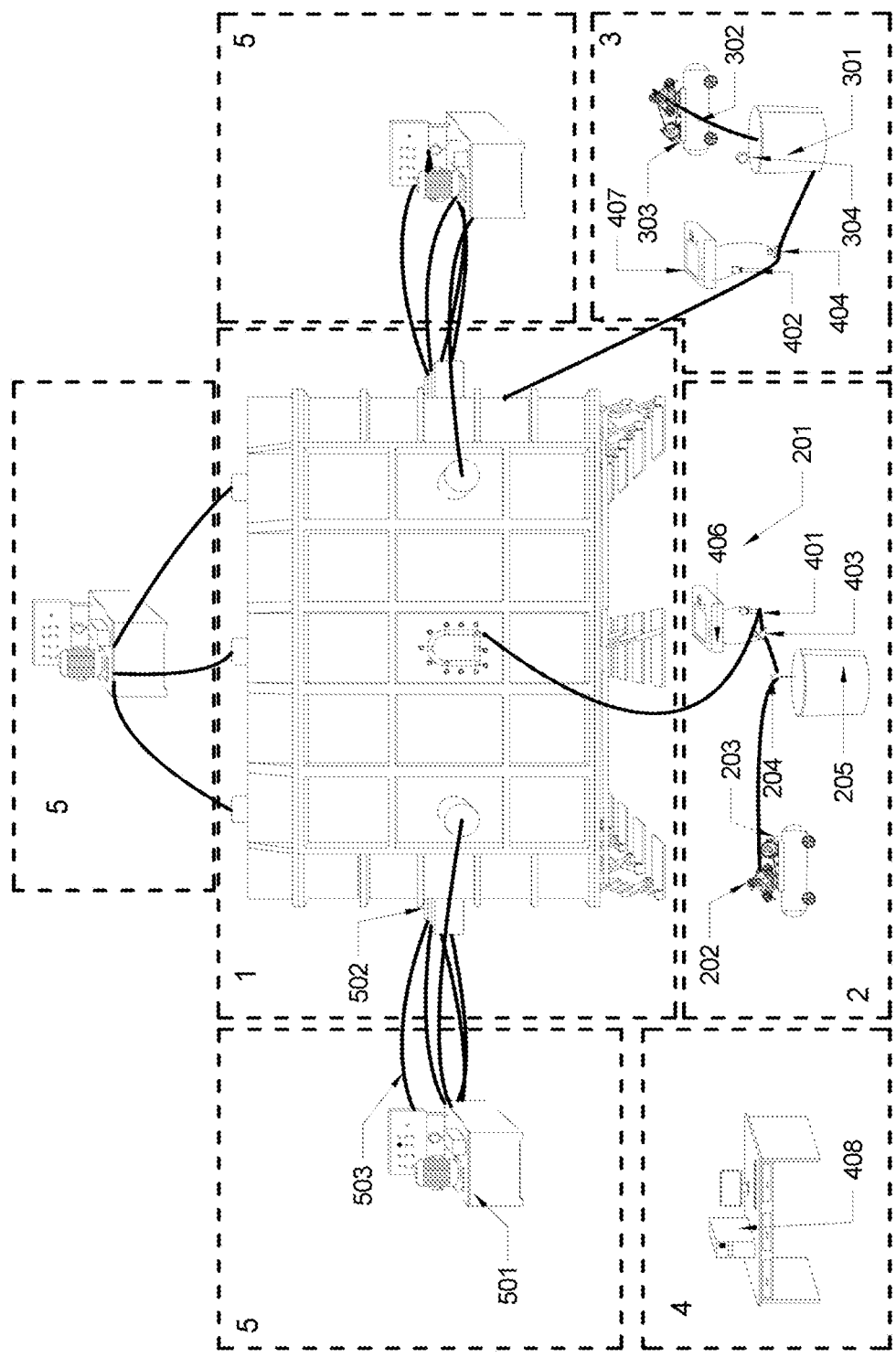
FIG. 1 is a structural schematic diagram of a three-dimensional model test device for curtain grouting and excavation of tunnels in high-temperature, water-rich and weak strata in this invention.
Figure 2:
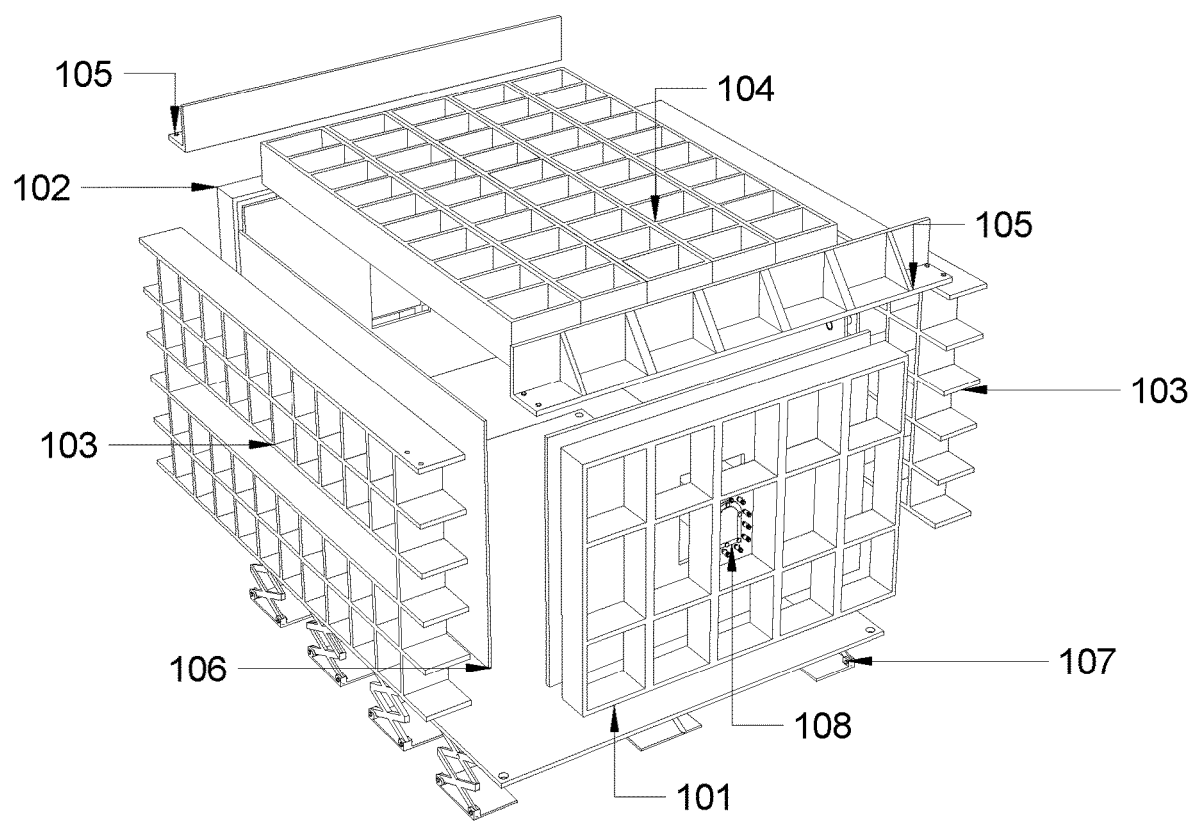
FIG. 2 is a schematic diagram of structure disassembling of the three-dimensional model test device for the curtain grouting and excavation of the high-temperature water-rich weak stratum tunnel in this invention.

In Figures, 1: weak strata simulation system; 2: curtain grouting system; 3: water pressure simulation system; 4: monitoring and data acquisition system; 5: three-dimensional confining pressure simulation system; 101: grid frame on the slurry inlet surface; 102: grid frame on the slurry outlet surface; 103: side steel grid frame; 104: top steel grid; 105: connecting steel part; 106: acrylic board; 107: test platform; 108: arched excavation chamber; 109: ball valve; 110: water inlet hole; 111: drainage hole; 112: data cable lead-out hole; 113: arched cover; 114: high-strength bolt; 201: high-pressure pumping pipe; 202: slurry air compressor; 203: grouting air pressure adjustment device; 204: grouting pump; 205: mixing tank; 206: segmented grouting device; 207: vertical grouting pipe; 208: coupling component; 209: grouting hose; 210: overflow hole; 211: curtain grouting hole; 301: water storage pressure tank; 302: water pressure simulation air compressor; 303: air pressure regulator; 304: pressure sensor; 401: grouting flow sensor; 402: dynamic water flow sensor; 403: grouting pressure sensor; 404: dynamic water pressure sensor; 405: strata pressure sensor; 406: displacement sensor; 407: paperless recorder; 408: data analyzer; 409: temperature sensor; 501: hydraulic station; 502: hydraulic cylinder; 503: hydraulic pipeline; 504: loading plate; 601: stainless-steel heating rod.

DETAILED DESCRIPTION OF THE EMBODIMENTS

This invention will be further described below in conjunction with the examples, but it should not be understood that the subject scope of this invention is limited to the following examples. Without departing from the above-mentioned technical idea of this invention, various replacements and changes are made according to common technical knowledge and conventional means shall be included in the protection scope of this invention in this field.

Additionally, in this invention, it should be understood that the terms "center", "inner", "upper", "lower", "front", "rear", "left" and "right" indicating orientations or positions are based on the orientation or positional relationship shown in the drawings, they are only convenient for describing this invention and simplifying the description, and they do not indicate or imply that the referred device or element must have a specific orientation, be constructed and operated in a specific orientation, and therefore they cannot be construed as limitations of this invention.

As shown in FIG. 1, this invention discloses a model test device for curtain grouting and excavation of tunnels in high-temperature, water-rich and weak strata. It comprises six parts: weak strata simulation system (1), curtain grouting system (2), water pressure simulation system (3), monitoring and data acquisition system (4), three-dimensional confining pressure simulation system (5), high geothermal simulation system.

As shown in FIGS. 2-6, the weak strata simulation system (1) is made up of a grid frame on the slurry inlet surface (101), a grid frame on the slurry outlet surface (102), side steel grid frames (103), a top steel grid (104), connecting steel parts (105), acrylic boards (106) and a test platform (107). The grid frame on the slurry inlet surface (101), grid frame on the slurry outlet surface (102), side steel grid frame (103) and top steel grid (104) are all steel grids made up of steel plates welded in both longitudinal and transverse directions, the bottom of steel grid is bolted to the test platform (107). In the grid frame on the slurry inlet surface (101), the central bottom of grid is made up with welded steel plates, and the center plate of the grid frame on the slurry inlet surface (101) has an arched excavation chamber (108) with a number of curtain grouting holes (211) at the outer edge of the arched excavation chamber. The number of side steel grid frames (103) is two and they are distributed on the left and right sides, the number of connecting steel parts (105) is two and they are bolted to the grid frame on the slurry inlet surface (101) and grid frame on the slurry outlet surface (102) respectively, the left and right ends of the connecting steel parts (105) are bolted to the top surface of the two sides of steel grid frames (103) respectively, placing the top surface grids on top of the loaded soft soil. Four acrylic boards (106), all of which are visualized, are placed on the grid frame on the slurry inlet surface (101), the grid frame on the slurry outlet surface (102) and the inside of the left and right side of steel grid frames (103). The acrylic board (106) placed on the rear side of the grid frame on the slurry inlet surface (101) is provided with arched excavation chamber (108) and curtain grouting holes (211). The acrylic board (106) placed on the back side of the grid frame on the slurry outlet surface (102) is provided with an arched excavation chamber (108). The acrylic boards placed behind the steel frames on the left and right sides are provided with water inlet holes (110), drainage holes (111) and sensor data cable lead-out holes (112) respectively, which are used to arrange steel pipe joints with threaded buckles to facilitate internal communication with the weak strata simulation system.

Figure 10:
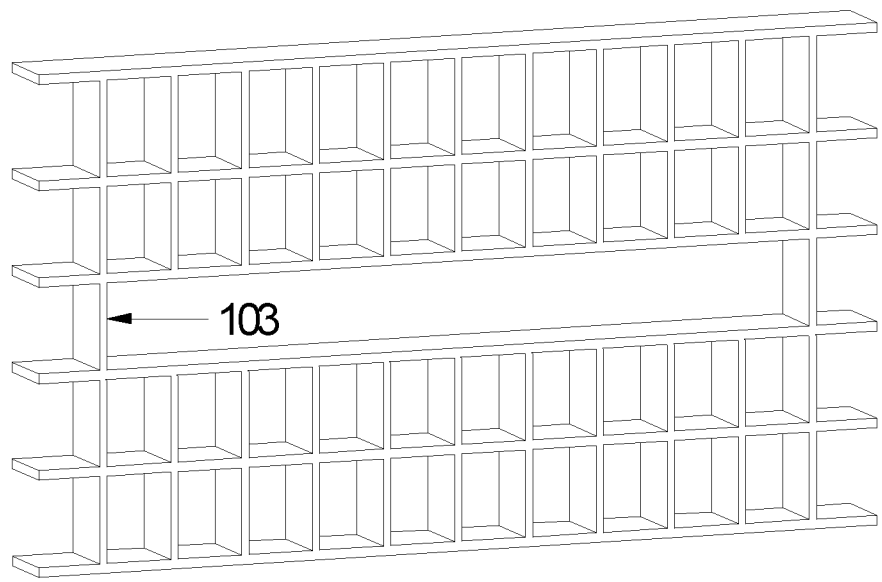
FIG. 10 is a three-dimensional schematic diagram of side network frame in this invention.
Figure 11:
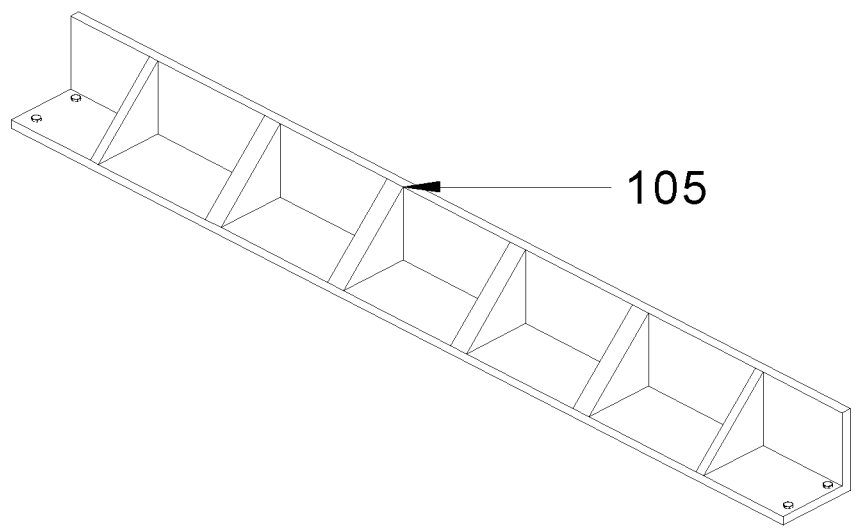
FIG. 11 is a three-dimensional schematic diagram of connecting steel parts in this invention.
Figure 12:
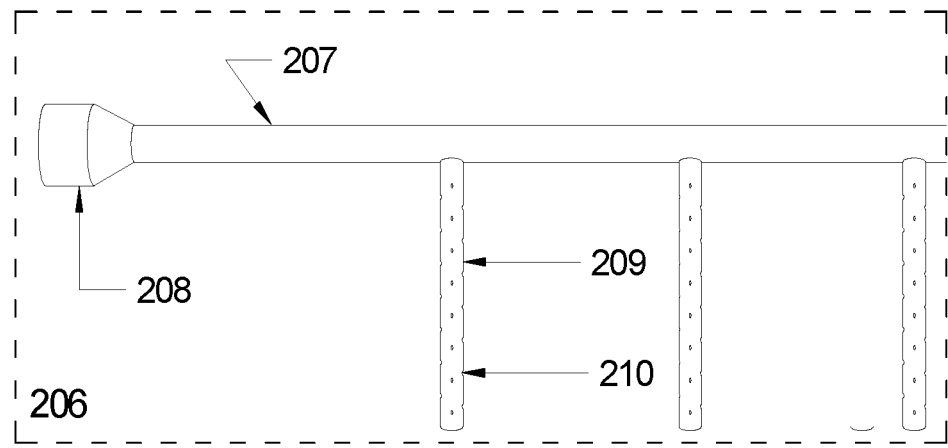
FIG. 12 is a three-dimensional schematic diagram of the slurry outlet bin in this invention.
Figure 13:
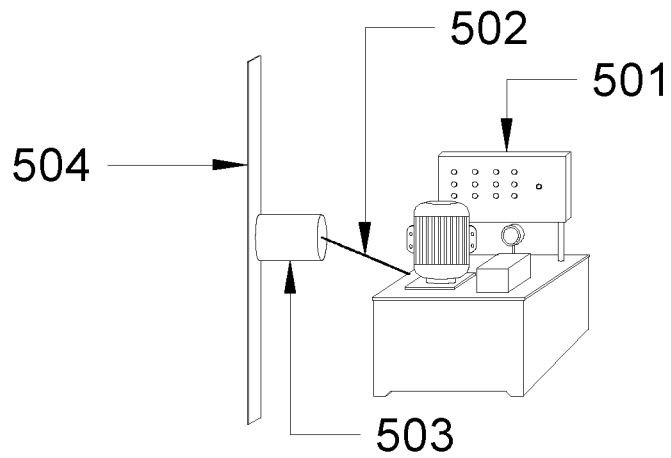
FIG. 13 is a schematic diagram of a group of reinforcement samples in this invention.

In this embodiment, the steel plates selected for the grid frame on the slurry inlet surface (101) and the slurry outlet surface (102) are distributed at equal intervals in the horizontal direction, and there are a total of six steel ribs with an interval of 50 cm. They are distributed at unequal vertical intervals. The distances from left to right are 40, 75, and 40 cm. The thickness of the steel plate is 2 cm, and the grid height is 30 cm. As shown in FIG. 10, the steel plates selected for the side steel grid frame (103) are distributed at equal intervals in the horizontal and vertical directions, with a distance of 40 cm, and each side extends 30 cm along the lateral sides, and the middle grid is cut along the longitudinal direction to form a hollow. As shown in FIG. 11, the connecting steel parts (105) are fixed connecting pieces formed by two vertical welding steel plates, and six triangular ribs are arranged along the length direction evenly.

An arched cover (113) is installed outside the arched excavation chamber (108), and the arched cover (113) is connected by high-strength bolts (114). During the grouting process, the arched cover (113) embedded in the soil plays a sealing role. Remove the arched cover (113) and place the arched excavation limit plate, the arched excavation limit plate is a welded arched steel plate, the size should match the size of the excavation hole to provide a reference for excavation.

Figure 7:
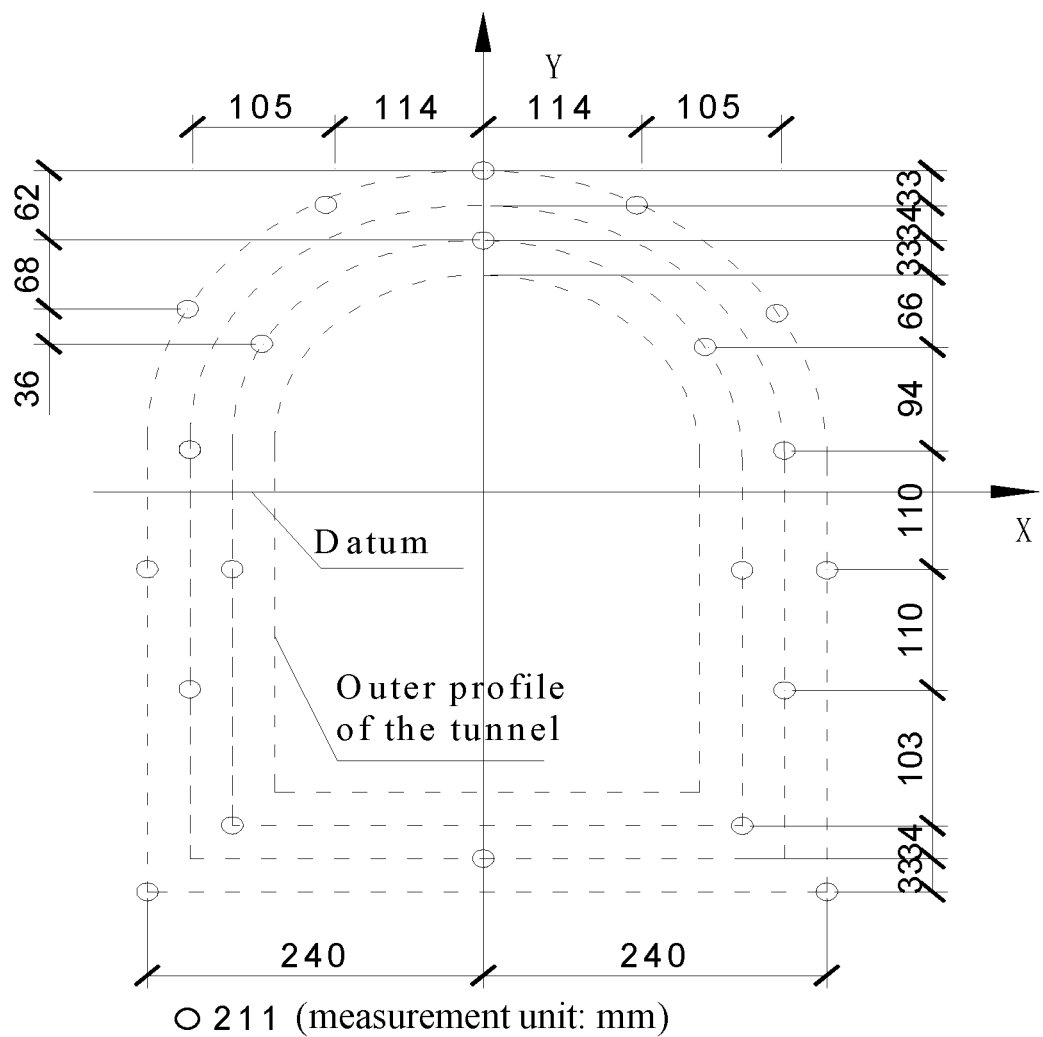
FIG. 7 is a layout plan of curtain grouting holes in this invention.
Figure 8:
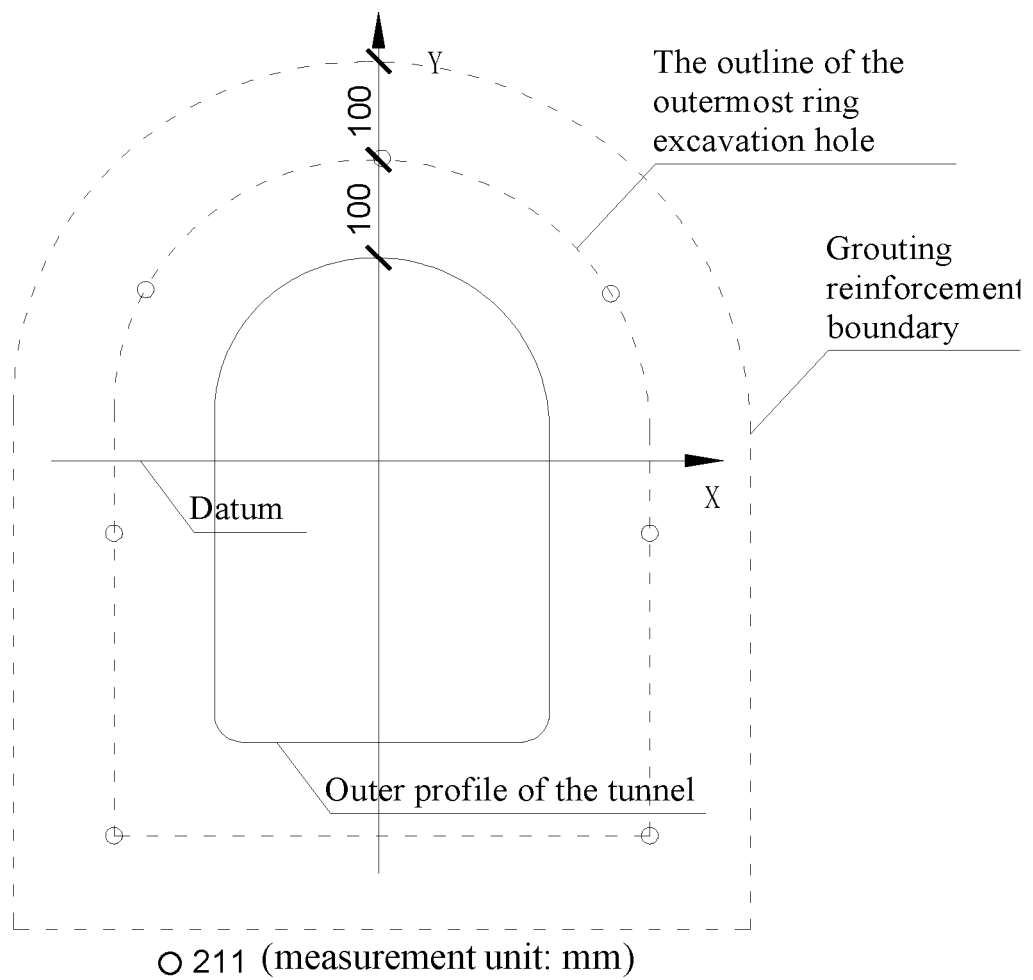
FIG. 8 is a cross-sectional view of the scope of curtain grouting reinforcement in this invention.
Figure 9:
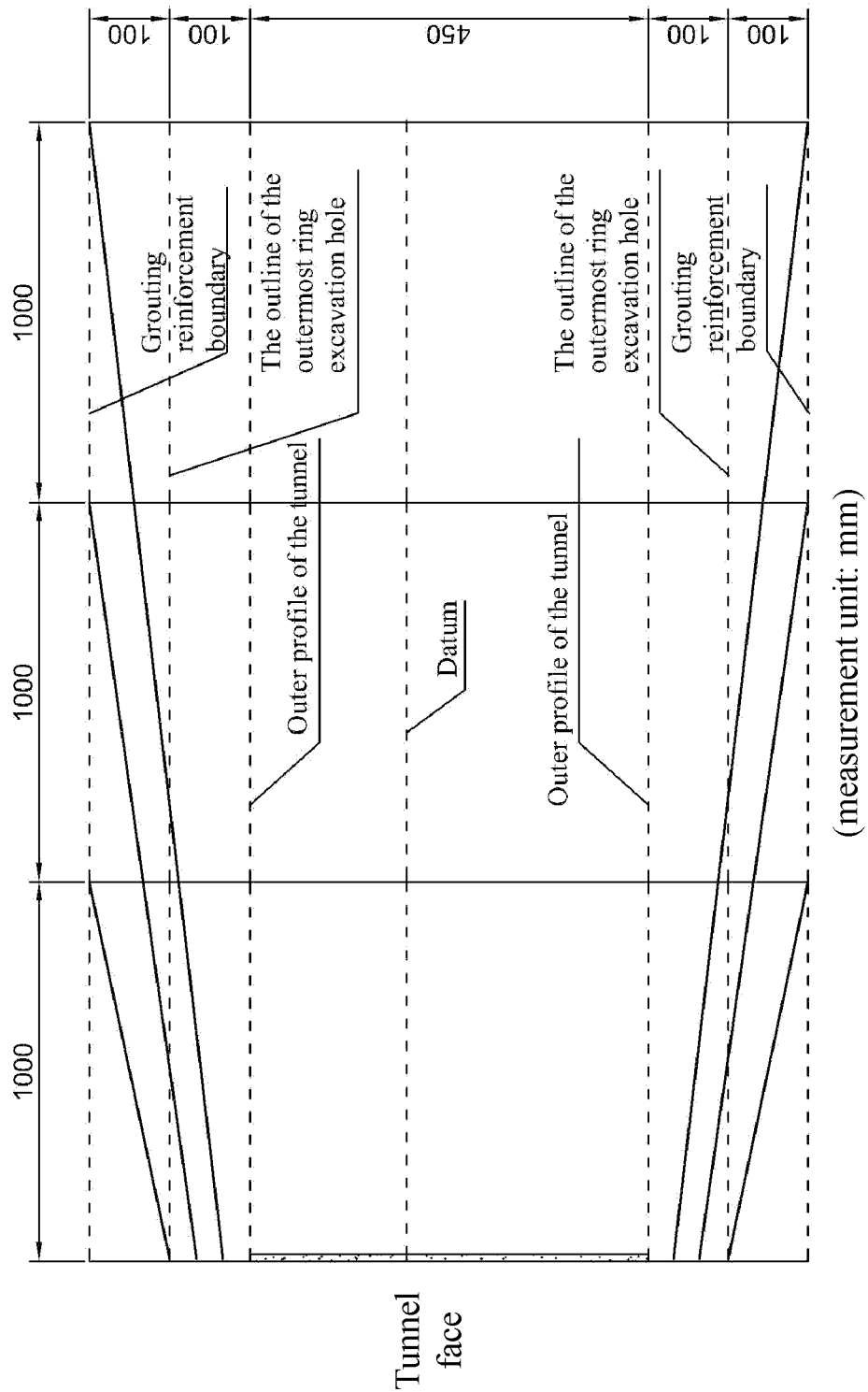
FIG. 9 is a longitudinal sectional view of the scope of curtain grouting reinforcement in this invention.

As shown in FIGS. 7-9, in this embodiment, three rows of curtain grouting holes (211) are staggered along the outer edge of the arched excavation chamber. It can be understood that in other embodiments, the positions, numbers and angles of the grouting holes should be arranged according to the actual simulated working conditions, the selected grout type and its diffusion distance. Each curtain grouting hole (211) connects to a segmented grouting device (206) located in the weak strata simulation system. Each segmented grouting device (206) includes a lateral extending grouting pipe (207), and the grouting pipe (207) connects to the ball valve (109) which is installed on the grouting hole of the grid frame on the grouting surface through a PVC coupling component (208). In the segmented grouting device corresponding to the curtain grouting hole (211) located in the outermost row, the vertical grouting pipe (207) extends to a distance of ⅓ of the excavation process of the soft soil body. In the segmental grouter corresponding to the curtain grouting hole (211) located in the middle row, the vertical grouting pipe (207) extends to a distance of ⅔ of the excavation process of the soft soil body. In the segmented grouting device corresponding to the curtain grouting hole (211) located in the innermost row, the vertical grouting pipe (207) extends to the distance of the entire excavation process of the soft soil body. On the side wall of the vertical grouting pipe (207), three grouting hoses (209) corresponding to the advance curtain grouting reinforcement area before tunnel excavation are connected in parallel, and each grouting hose (209) is provided with a plurality of overflow holes (210). The curtain grouting system can inject slurry to the soft soil in the weak strata simulation system through different rows of grouting holes, and the segmental grouting process can be realized in the soft soil.

The curtain grouting system includes high-pressure pumping pipes (201), a slurry air compressor (202), a slurry air pressure regulator (203), a grouting pump (204), and a mixing tank (205). Several curtain grouting holes (211)

arranged on the outer edge of the excavation chamber are excavated, and the high-pressure pumping pipe (201) adopts a PVC transparent steel wire spiral reinforced hose. The slurry air compressor (202) connects to the air inlet of the mixing tank (205) through an air inlet pipe. The slurry air compressor (202) is connected with an air pressure regulator (303) for adjusting the stable output air pressure.

The water pressure simulation system includes a water storage pressure tank (301) and a water pressure simulation air compressor (302). The water storage pressure tank has good airtightness, and an air inlet is arranged at the center of its upper end, and a pressure sensor (304) is arranged to monitor the air pressure in the tank. The lower end is provided with a liquid discharge port about 5 cm away from the bottom of the tank. The air inlet of the water storage pressure tank connects to the air outlet of the air pressure regulator (303) on the water pressure simulation air compressor (302), and the liquid outlet of the water storage pressure tank connects to the water inlet hole (110) of the weak strata simulation system.

The three-dimensional confining pressure simulation system includes a hydraulic station (501) and multiple loading units. Loading units are distributed on the top, left, right, front and back of the weak strata simulation system. Each loading unit includes hydraulic cylinders (502), hydraulic pipelines (503) and a loading plate (504). The hydraulic cylinders (502) are arranged on the steel grid frame. The loading plate (504) is located in the soft formation simulation system and contacts the soft soil. The hydraulic cylinder (502) connects to the hydraulic station (501) through hydraulic pipelines (503). The three-dimensional confining pressure simulation system (5) can apply system confining pressure along the top surface, the front and rear directions, and the left and right directions of the weak strata simulation system, and the ground stress loading range is 0~2.5 MPa.

The high geothermal simulation system includes several stainless-steel heating rods (601). The adjustable temperature of the stainless-steel heating rods (601) is 35~90° C., the diameter is 3.8 cm, and the length is 28 cm. The stainless-steel heating rods (601) are fixed vertically on the left and right sides of the inner side of steel grid frame and they are buried in the soft soil.

The monitoring and data acquisition system includes a grouting flow sensor (401), a dynamic water flow sensor (402), a grouting pressure sensor (403), a dynamic water pressure sensor (404), strata pressure sensors (405), displacement sensors (406), paperless recorders (407), a data analyzer (408), temperature sensors (409) and other monitoring components. Before The grouting flow sensor (401) is connected to the ball valve (109) of the grouting surface steel frame through the high-pressure pumping pipe (201), the dynamic water flow sensor (402) is connected to the hydraulic simulation system, and is connected to the water inlet hole (110) on the rear acrylic board of the side steel frame through a high-pressure pumping pipe. The grouting pressure sensor (403) is placed before the grouting flow sensor (401). The dynamic water pressure sensor (404) is placed before the dynamic water pressure flow sensor (402). The formation pressure sensors (405) and displacement sensors (406) are placed in the weak strata simulation system filled with sand. There are two paperless recorders (407), and one is located in the curtain grouting system (2) parallel connecting to grouting flow sensor (401), grouting pressure sensor (403), and the other is located in water pressure simulation system (3) parallel connecting to dynamic water flow sensor (402) and dynamic water pressure sensor (404). The data analyzer (408) connects to each monitoring element with formation pressure sensor data lines, displacement sensor data lines, and temperature sensor data lines. The temperature sensor (409) is buried inside the weak strata simulation system (1).

Figure 3:
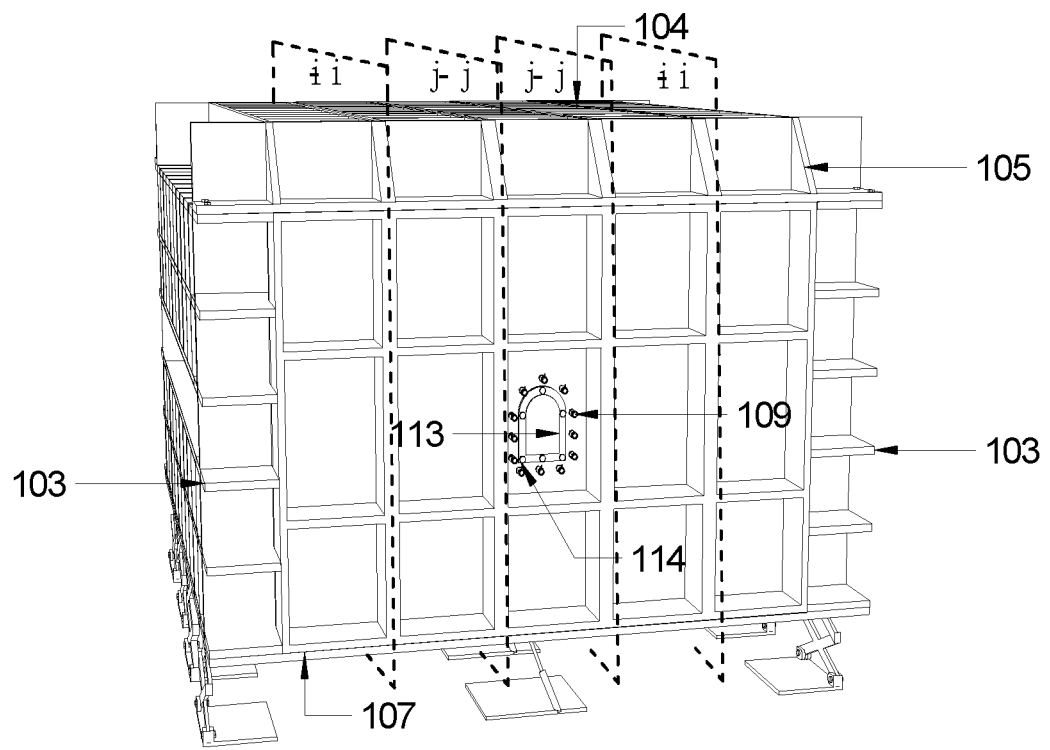
FIG. 3 is a three-dimensional structure schematic diagram of one side of the slurry inlet surface network frame of the three-dimensional model test device of tunnel curtain grouting and excavation in the high-temperature, water-rich and soft strata in this invention.
Figure 4:
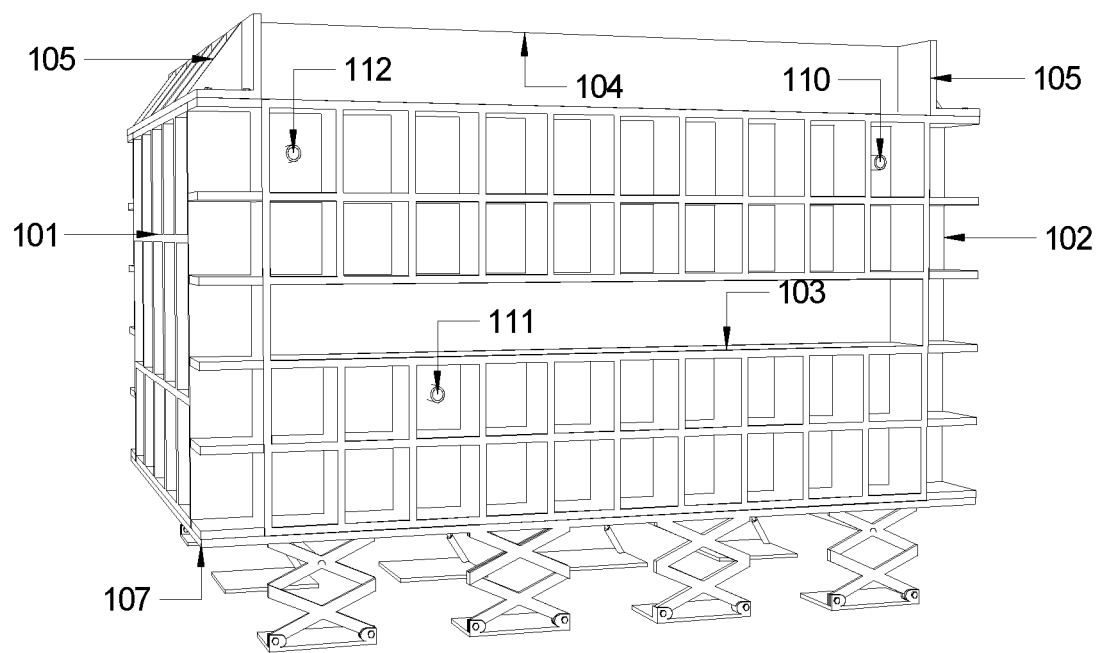
FIG. 4 is a three-dimensional structure schematic diagram of one side of the steel grid frame side of the three-dimensional model test device of tunnel curtain grouting and excavation in the high-temperature, water-rich and soft strata in this invention.
Figure 5:
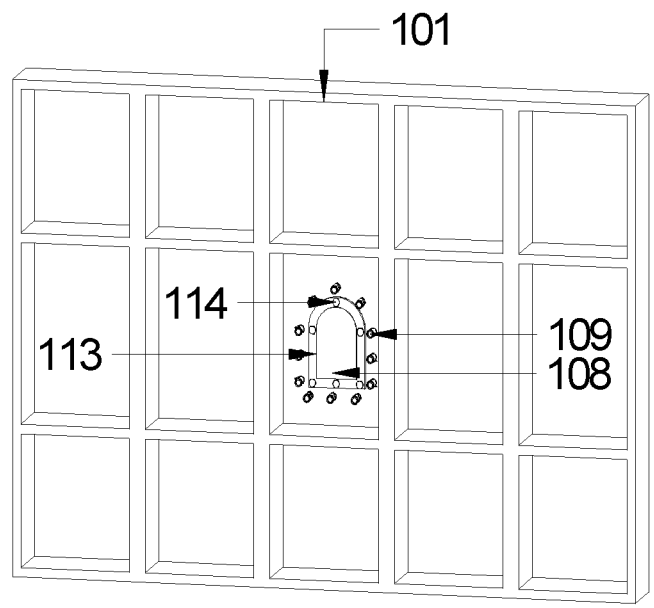
FIG. 5 is a three-dimensional structure schematic diagram of the slurry inlet surface network frame in this invention.
Figure 6:
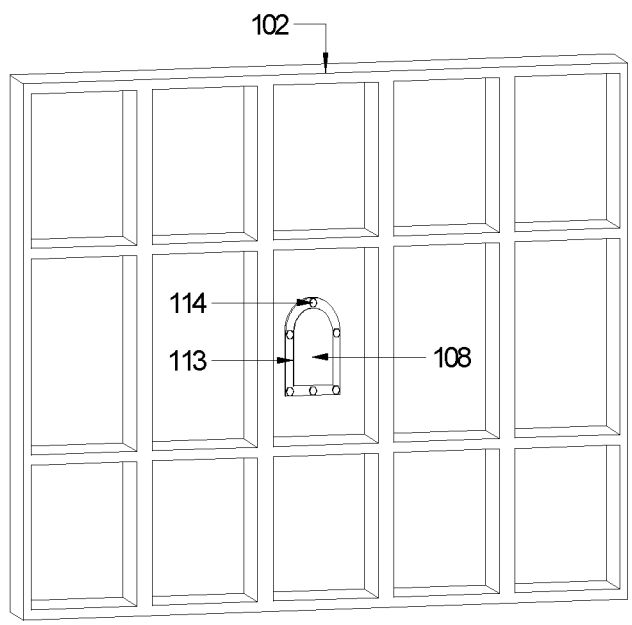
FIG. 6 is a three-dimensional schematic diagram of the slurry outlet surface grid frame in this invention.
Figure 14:
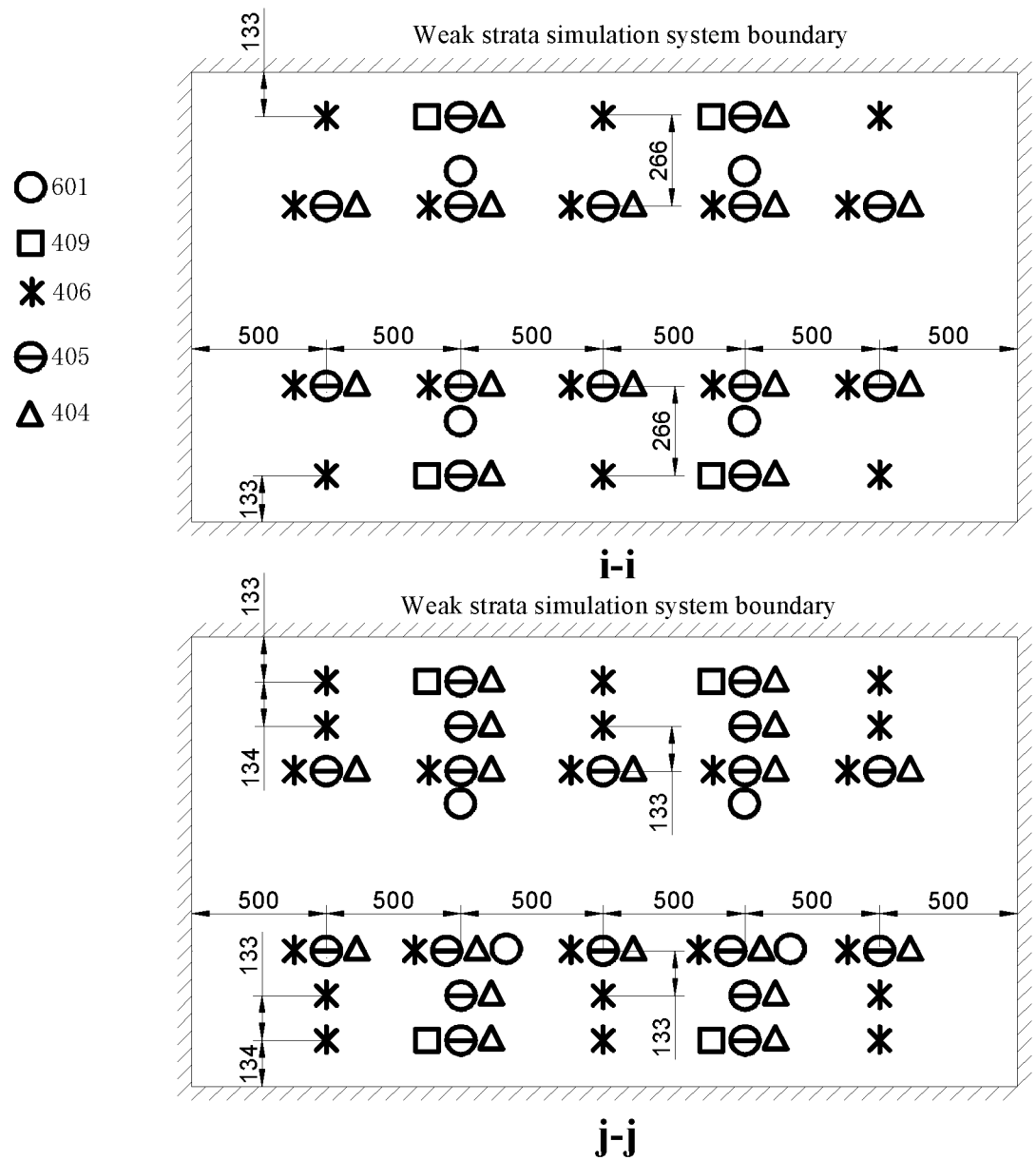
FIG. 14 is a layout schematic diagram of internal monitoring elements and stainless-steel heating rod in weak strata simulation system in this invention.

As shown in FIG. 14, the figure is a plan view of the layout of monitoring elements and stainless-steel heating rods (601) in the weak strata simulation system (1) used in this example. It is used to monitor the stress, strain and temperature field changes in the weak strata during the grouting process and the excavation process. At the same time, it can also monitor the impact of subsequent excavation on the previous reinforcement section and the impact of different water pressures on the formation, providing data support for subsequent quantitative description and theoretical establishment. The reference arrangement section position of the monitoring element and the stainless-steel heating rod (601) is shown in FIG. 3. It is understandable that in other embodiments, the location and quantity of the monitoring elements and stainless-steel heating rods (601) should be selected according to the actual simulation requirements.

The soft soil body (hereinafter referred to as the injected medium) used in this embodiment is a water-rich sandy soil material. It is understandable that in other embodiments, the injected medium should be selected according to the actual survey results of the weak strata.

The physical performance parameters of the selected sand injection layer are shown in Table 1:

TABLE 1

| Moisture content/% | Control particle size/$D_{90}$ | $D_{10}$/mm | $D_{15}$/mm | $D_{90}$/mm | Coefficient uniformity |
|---|---|---|---|---|---|
| 19.7 | 1.00 | 0.05 | 0.12 | 0.39 | 40.2 |

The mechanical property parameters of the selected sand injection layer are shown in Table 2:

TABLE 2

| Initial dry density/(g · cm$^{-3}$) | Compression modulus $E_s$/MPa | Initial void ratio/MPa | Initial permeability coefficient/(cm · s$^{-1}$) |
|---|---|---|---|
| 1.47 | 4.10 | 0.82 | 3.1 × 10$^{-3}$ |

The application also provides a model test method for curtain grouting and excavation of tunnels in high-temperature, water-rich and weak strata, which mainly uses the model test device described in this invention to carry out the test method, including the following steps:

Step (1): Before the test is carried out, it should be designed firstly. Specifically, the position of the monitoring elements in the weak strata simulation system 1 and reshaping the soil should be designed according to the actual needs and conditions before test.

Step (2): Before filling the medium to be injected, place the hydraulic cylinders (502) with the loading plate inside each grid surface through the hollowing out of the steel frame, and then assemble the weak strata simulation system (1) except the top steel grid (104) as required. PVC film should be laid in the test space formed by the weak strata simulation system (1) to prevent water seepage in the connection gap.

Step (3): When the injected medium is filled, the monitoring components should be arranged in time, and the formation pressure sensors (405), displacement sensors (406), and temperature sensors (409) should be embedded according to the preset plan, and the monitoring and data acquisition system should be debugged in time. When embedding, segmented grouting device (206) and grouting pipe (207) should be buried in different advance curtain grouting sections according to the design at the same time, and the opening angle of the face should be adjusted, and then the hydraulic simulation system should be installed.

Step (4): After the injected medium is filled completely and the test equipment is assembled and connected, a pressure water test should be carried out firstly to check whether there is an obvious gap between the entire device and the connection position of each place, so as to ensure that hidden dangers can be checked in time to ensure that the later test is carried out normally. The data of seepage velocity and pressure field in the medium can be also obtained before being injected.

Step (5): After the hydraulic test is completed, start the stainless-steel heating rods (601) before loading the ground stress every time and load it to the specified temperature, and then turn off the power supply of the stainless-steel heating rods (601). Afterwards, three-dimensional confining pressure loads are applied according to the designed ground stress, and temperature field and stress field at key positions are reflected in real time in order to verify whether the confining pressure loading complies with the expected requirements of the test. During the loading process of three-dimensional confining pressure, it should be confirmed that the power supply of the stainless-steel heating rods (601) is turned off.

Step (6): The curtain grouting system (2) connects to the curtain grouting hole (211) of the weak strata simulation system (1), and the grouting test is carried out. When the output air pressure of the slurry air compressor (202) is guaranteed to be stable at the design requirements, a grouting test is performed. During the grouting process, keep the parameters of the high geothermal simulation system, water pressure simulation system, and three-dimensional confining pressure simulation system be stable, pay attention to and record the output data of the monitoring components in time during the grouting process. During the grouting process, the segmented grouting test is performed in three sections according to the buried position of the segmented grouter. It can be understood that in other embodiments, a corresponding number of excavation and grouting reinforcement construction sections should be selected according to the test design requirements. After each section of grouting test is finished, the arched cover (113) is opened after the output data of each monitoring element remains stable, and the excavation limit plate is placed to guide the excavation. During the excavation process, the excavation distance and the output data of the monitoring and data acquisition system (4) are recorded continuously. Excavation is stopped when the excavation reaches one-third of the whole distance. When the output data of the monitoring components is stable, the hydraulic cementitious grouting material can be injected again in the excavation section of the tunnel especially for the tunnel vault, side walls and the face of the palm. Repeat the above grouting and excavation steps again, and record the impact of the subsequent excavation process on the previous reinforcement section.

Step (7): After the excavation of the whole tunnel is completed, the continuous and stable three-dimensional loading of the three-dimensional confining pressure simulation system is maintained, and the internal temperature change is monitored in real time. The flow output of the water pressure simulation system (3) is increased gradually and the water supply pressure is increased until water and mud inrushes occur in the simulated tunnel. Record the output data of monitoring components in real time during the whole test process.

Step (8): After the test, disassemble the simulation test system. The grouted medium can be cut to observe the distribution of pulp veins in different sections directly. Afterwards, the test data is analyzed, and the reinforcement effects of curtain grouting on weak strata are recorded and summarized under three-dimensional confining pressure and controllable water pressure gradual loading.

The above specific implementation manners cannot be regarded as limiting the protection scope of this invention. For those skilled in the art, any substitution, improvement or transformation made to the implementation manners of this invention shall fall within the protection scope of this invention.

The technology parts of this invention that are not described in detail are known in the art.

What is claimed is:
1. A curtain grouting and excavation model test device for tunnels in high-temperature, water-rich and weak strata, comprising a weak strata simulation system, a curtain grouting system, a working condition simulation system, and a monitoring and data acquisition system,
wherein the weak strata simulation system is a main box body used to fill soft soil, a front side of the weak strata simulation system is a slurry entry surface, a back side of the weak strata simulation system is a slurry exit surface, centers of both the slurry entry surface and the slurry exit surface are equipped with an arched excavation chamber, several grouting holes with the shapes of clubs are arranged on the outer edge of the arched excavation chamber on the slurry entry surface, each of the grouting holes connects to a segmented grouting device located in the weak strata simulation system, and each of the segmented grouting device includes a laterally extending grouting pipe, a plurality of grouting hoses corresponding to an advance curtain grouting reinforcement area before tunnel excavation are connected in parallel to the side wall of the grouting pipe, and each of the grouting hose is provided with a plurality of grout overflow holes, in the segmented grouting device corresponding to the grouting hole located in an outermost row, the grouting pipe extends to a distance of ⅓ of an excavation process of the soft soil, in the segmented grouting device corresponding to the grouting holes in a middle row, the grouting pipe extends to a distance of ⅔ of the excavation process of the soft soil, in the segmented grouting device corresponding to an innermost row of the grouting holes, the grouting pipe extends to a distance of an entire excavation process of the soft soil,
wherein the curtain grouting system injects slurry to the soft soil in sections in the weak strata simulation system through the grouting holes,
wherein the working condition simulation system includes a high geothermal simulation system, a water pressure simulation system, and a three-dimensional confining pressure simulation system, the high geothermal simulation system heats the soft soil in the weak strata simulation system, the water pressure simulation system injects water into the soft soil in the simulation system, the three-dimensional confining pressure simulation system exerts pressure on the soft soil in the weak strata simulation system, and the monitoring and data acquisition system is used for monitoring and collecting relevant test parameters of the soft soil in the weak strata simulation system.

2. The model test device according to claim 1, wherein the weak strata simulation system consists of a grid frame on the slurry inlet surface, a grid frame on the slurry outlet surface, side steel grid frames, top steel grid frames, connecting steel parts, acrylic boards and a test platform, a number of side steel grid frames is two and are distributed on left and right sides, the grid frame on the slurry inlet surface, the grid frame on the slurry outlet surface, the side steel grid frame and the top steel grid frame are all steel grid frames welded by steel plates along vertical and horizontal directions, a bottom of the steel grid frame connects to the test platform by bolts,
- wherein a number of the connecting steel parts is two, and are connected to top surfaces of the grid frame on the slurry inlet surface and the grid frame on the slurry outlet surface by the bolts respectively, and a left end and a right end of the connecting steel parts connect to the top surfaces of two side steel grid frames by the bolts, the top surface steel grid frame is placed on the soft soil,
- wherein a number of the acrylic boards is four, which are placed on inner sides of the grid frame on the slurry inlet surface, the grid frame on the slurry outlet surface, and the steel frames on the left and right sides, respectively, the acrylic board placed on the inner side of the grid frame on the slurry inlet surface is provided with arched excavation chambers and grouting holes, the acrylic board placed on a back side of the grid frame on the slurry outlet surface is provided with an arched excavation chamber, the acrylic boards placed behind the steel frames on the left and right sides are provided with water inlet holes, drainage holes and sensor data cable lead-out holes, respectively.

3. The model test device according to claim 2, wherein the curtain grouting system includes a high-pressure pumping pipe, a slurry air compressor, a grouting air pressure regulator, a grouting pump and a mixing tank, the high-pressure pumping pipe is connected to the mixing tank, the grouting pump and the grouting holes in the weak strata simulation system sequentially, the slurry air compressor connects to the grouting air pressure regulator.

4. The model test device according to claim 3, wherein the high geothermal simulation system includes several stainless-steel heating rods, and an adjustable temperature range of the stainless-steel heating rods is 35-90° C., the stainless-steel heating rods are fixed vertically on the inner surface of the side steel grid frame and is embedded in the soft soil.

5. The model test device according to claim 4, wherein the three-dimensional confining pressure simulation system includes a hydraulic station and multiple loading units, the loading units are distributed on top, left, right, front and rear of the weak strata simulation system, and each of the loading unit includes hydraulic cylinders and loading plates, the hydraulic cylinder is arranged on a steel grid frame, and the loading plate is buried in the soft soil in the weak strata simulation system, the hydraulic cylinders connect to the hydraulic station through hydraulic pipelines.

6. The model test device according to claim 5, wherein the monitoring and data acquisition system includes temperature sensors, grouting flow sensors, dynamic water flow sensors, grouting pressure sensors, dynamic water pressure sensors, strata pressure sensors, displacement sensors, high-definition cameras, paperless recorders, and a data analyzer, the temperature sensors are buried inside the weak strata simulation system, the grouting flow sensor connects to the curtain grouting system, the grouting pressure sensor is placed before the grouting flow sensor, the dynamic water flow sensor connects to a water pressure simulation system, the dynamic water pressure sensor is placed before the dynamic water flow sensor, the strata pressure sensors and displacement sensors are embedded in the weak strata simulation system filled up with soft soil, a total of two paperless recorders are located in the curtain grouting system parallel connecting to the grouting flow sensors, the grouting pressure sensors and the water pressure simulation system, the dynamic water flow sensors, and the dynamic water pressure sensors.

7. The model test device according to claim 6, wherein the connecting steel parts are formed by two vertically welding steel plates, and a fixed connecting piece with a plurality of triangular ribs arranged along the length direction evenly.

8. The model test device according to claim 5, wherein the connecting steel parts are formed by two vertically welding steel plates, and a fixed connecting piece with a plurality of triangular ribs arranged along the length direction evenly.

9. The model test device according to claim 4, wherein the connecting steel parts are formed by two vertically welding steel plates, and a fixed connecting piece with a plurality of triangular ribs arranged along the length direction evenly.

10. A model test method for curtain grouting and excavation of tunnels in high-temperature, water-rich and weak strata, wherein the method uses the model test device according to claim 4 to carry out the test method comprising the following steps:
- (1) before the test is carried out, the test is designed firstly, and the positions of the monitoring components in the soil and the weak stratum simulation system is replaced according to actual needs and conditions before use,
- (2) before the medium is injected, the hydraulic cylinders with the loading plate are hollowed out inside of each grid surface through the steel frame, and then the weak strata simulation system except the top steel frame is assembled according to the demands, and the PVC films is placed in the test space within the weak strata simulation system to prevent water seepage in the connection gap,
- (3) the monitoring elements are arranged promptly during the injection process of the medium, stainless-steel heating rods, temperature sensors, strata pressure sensors, displacement sensors, and stress sensors are buried in advance according to the preset plan, the monitoring and data acquisition system is debugged promptly, the stainless-steel heating rods constitute the high-temperature simulation system, and then the water pressure simulation system is installed,
- (4) after the injected medium is filled completely and the test equipment is assembled and connected, a hydraulic test is carried out firstly to check whether there are obvious gaps between the entire device and the connection positions of various places, so as to ensure that hidden dangers is checked in time and ensure that the later tests are carried out normally, data such as seepage velocity and pressure field in the medium is obtained before grouting,
- (5) after the hydraulic test is completed, start the stainless-steel heating rods before loading the ground stress every time, and then turn off the power supply of the stainless-steel heating rods after reaching the specified temperature, afterwards, three-dimensional confining pressure loads are applied according to the designed ground stress, and the temperature field and stress field at key positions are recorded in real time, which is in order to verify whether the confining pressure loading complies with the expected requirements of the test, during the loading process of confining pressure, it should be confirmed that the power supply of the stainless-steel heating rod is turned off,
- (6) the curtain grouting system connects to the grouting hole of the weak strata simulation system for the grouting test, during the grouting process, the parameters of the high geothermal simulation system, water pressure simulation system, and three-dimensional confining pressure simulation system are kept stable, and the output data of the monitoring components are paid attention to and recorded in time, during the grouting process, a multi-stage grouting test is carried out, after each stage of the grouting test, the arched cover is opened after the output data of each monitoring element remains stable, and the excavation limit plate is placed to guide the excavation, during the excavation process, the excavation distance and the output data of the monitoring and data acquisition system are recorded continuously, when the output data of the monitoring components is stable, the hydraulic gelling grouting material can be injected again in the excavation section of the tunnel, after excavation, the tunnel vault, side walls, tunnel face, etc. are reinforced by grouting, and the above steps of grouting and excavation shall be repeated again, and the impact of the subsequent excavation process on the previous reinforcement section shall be recorded,
- (7) after the entire tunnel excavation is completed, the continuous and stable three-dimensional loading of the three-dimensional confining pressure simulation system is maintained, and the output flow rate of the water pressure simulation system is increased gradually, and the water supply pressure is enhanced until the simulation of water inrush and mud inrush occurs, and the test is stopped, the output data of the monitoring components are recorded throughout the test in real time,
- after the test is over, the simulation test system is disassembled, the injected medium is cut, and the distribution of slurry veins is observed directly in different sections, and then the test data is analyzed, the reinforcement effects of slurry on weak strata are recorded and summarized under high temperature three-dimensional confining pressure and water pressure controllable gradient loadings.

11. The model test device according to claim 3, wherein the water pressure simulation system includes a water storage pressure tank and a water pressure simulation air compressor, the water storage pressure tank has good airtightness, and an air inlet is arranged at a center of an upper end of the water storage pressure tank and a barometer is arranged to monitor the air pressure in the water storage pressure tank, the air inlet of the water storage pressure tank connects to the air pressure regulator of the water pressure simulation air compressor, a lower end of the water storage pressure tank is provided with a liquid discharge port at a distance from a bottom of the water storage pressure tank, the liquid discharge port of the water storage pressure tank connects to the water inlet hole of the weak strata simulation system.

12. The model test device according to claim 11, wherein the connecting steel parts are formed by two vertically welding steel plates, and a fixed connecting piece with a plurality of triangular ribs arranged along the length direction evenly.

13. A model test method for curtain grouting and excavation of tunnels in high-temperature, water-rich and weak strata, wherein the method uses the model test device according to claim 11 to carry out the test method comprising the following steps:
- (1) before the test is carried out, the test is designed firstly, and the positions of the monitoring components in the soil and the weak stratum simulation system is replaced according to actual needs and conditions before use,
- (2) before the medium is injected, the hydraulic cylinders with the loading plate are hollowed out inside of each grid surface through the steel frame, and then the weak strata simulation system except the top steel frame is assembled according to the demands, and the PVC films is placed in the test space within the weak strata simulation system to prevent water seepage in the connection gap,
- (3) the monitoring elements are arranged promptly during the injection process of the medium, stainless-steel heating rods, temperature sensors, strata pressure sensors, displacement sensors, and stress sensors are buried in advance according to the preset plan, the monitoring and data acquisition system is debugged promptly, the stainless-steel heating rods constitute the high-temperature simulation system, and then the water pressure simulation system is installed,
- (4) after the injected medium is filled completely and the test equipment is assembled and connected, a hydraulic test is carried out firstly to check whether there are obvious gaps between the entire device and the connection positions of various places, so as to ensure that hidden dangers is checked in time and ensure that the later tests are carried out normally, data such as seepage velocity and pressure field in the medium is obtained before grouting,
- (5) after the hydraulic test is completed, start the stainless-steel heating rods before loading the ground stress every time, and then turn off the power supply of the stainless-steel heating rods after reaching the specified temperature, afterwards, three-dimensional confining pressure loads are applied according to the designed ground stress, and the temperature field and stress field at key positions are recorded in real time, which is in order to verify whether the confining pressure loading complies with the expected requirements of the test, during the loading process of confining pressure, it should be confirmed that the power supply of the stainless-steel heating rod is turned off,
- (6) the curtain grouting system connects to the grouting hole of the weak strata simulation system for the grouting test, during the grouting process, the parameters of the high geothermal simulation system, water pressure simulation system, and three-dimensional confining pressure simulation system are kept stable, and the output data of the monitoring components are paid attention to and recorded in time, during the grouting process, a multi-stage grouting test is carried out, after each stage of the grouting test, the arched cover is opened after the output data of each monitoring element remains stable, and the excavation limit plate is placed to guide the excavation, during the excavation process, the excavation distance and the output data of the monitoring and data acquisition system are recorded continuously, when the output data of the monitoring components is stable, the hydraulic gelling grouting material can be injected again in the excavation section of the tunnel, after excavation, the tunnel vault, side walls, tunnel face, etc. are reinforced by grouting, and the above steps of grouting and excavation shall be repeated again, and the impact of the subsequent excavation process on the previous reinforcement section shall be recorded, (7) after the entire tunnel excavation is completed, the continuous and stable three-dimensional loading of the three-dimensional confining pressure simulation system is maintained, and the output flow rate of the water pressure simulation system is increased gradually, and the water supply pressure is enhanced until the simulation of water inrush and mud inrush occurs, and the test is stopped, the output data of the monitoring components are recorded throughout the test in real time, after the test is over, the simulation test system is disassembled, the injected medium is cut, and the distribution of slurry veins is observed directly in different sections, and then the test data is analyzed, the reinforcement effects of slurry on weak strata are recorded and summarized under high temperature three-dimensional confining pressure and water pressure controllable gradient loadings.

14. The model test device according to claim 3, wherein the connecting steel parts are formed by two vertically welding steel plates, and a fixed connecting piece with a plurality of triangular ribs arranged along the length direction evenly.

15. A model test method for curtain grouting and excavation of tunnels in high-temperature, water-rich and weak strata, wherein the method uses the model test device according to claim 3 to carry out the test method comprising the following steps:

(1) before the test is carried out, the test is designed firstly, and the positions of the monitoring components in the soil and the weak stratum simulation system is replaced according to actual needs and conditions before use, (2) before the medium is injected, the hydraulic cylinders with the loading plate are hollowed out inside of each grid surface through the steel frame, and then the weak strata simulation system except the top steel frame is assembled according to the demands, and the PVC films is placed in the test space within the weak strata simulation system to prevent water seepage in the connection gap, (3) the monitoring elements are arranged promptly during the injection process of the medium, stainless-steel heating rods, temperature sensors, strata pressure sensors, displacement sensors, and stress sensors are buried in advance according to the preset plan, the monitoring and data acquisition system is debugged promptly, the stainless-steel heating rods constitute the high-temperature simulation system, and then the water pressure simulation system is installed, (4) after the injected medium is filled completely and the test equipment is assembled and connected, a hydraulic test is carried out firstly to check whether there are obvious gaps between the entire device and the connection positions of various places, so as to ensure that hidden dangers is checked in time and ensure that the later tests are carried out normally, data such as seepage velocity and pressure field in the medium is obtained before grouting, (5) after the hydraulic test is completed, start the stainless-steel heating rods before loading the ground stress every time, and then turn off the power supply of the stainless-steel heating rods after reaching the specified temperature, afterwards, three-dimensional confining pressure loads are applied according to the designed ground stress, and the temperature field and stress field at key positions are recorded in real time, which is in order to verify whether the confining pressure loading complies with the expected requirements of the test, during the loading process of confining pressure, it should be confirmed that the power supply of the stainless-steel heating rod is turned off, (6) the curtain grouting system connects to the grouting hole of the weak strata simulation system for the grouting test, during the grouting process, the parameters of the high geothermal simulation system, water pressure simulation system, and three-dimensional confining pressure simulation system are kept stable, and the output data of the monitoring components are paid attention to and recorded in time, during the grouting process, a multi-stage grouting test is carried out, after each stage of the grouting test, the arched cover is opened after the output data of each monitoring element remains stable, and the excavation limit plate is placed to guide the excavation, during the excavation process, the excavation distance and the output data of the monitoring and data acquisition system are recorded continuously, when the output data of the monitoring components is stable, the hydraulic gelling grouting material can be injected again in the excavation section of the tunnel, after excavation, the tunnel vault, side walls, tunnel face, etc. are reinforced by grouting, and the above steps of grouting and excavation shall be repeated again, and the impact of the subsequent excavation process on the previous reinforcement section shall be recorded, (7) after the entire tunnel excavation is completed, the continuous and stable three-dimensional loading of the three-dimensional confining pressure simulation system is maintained, and the output flow rate of the water pressure simulation system is increased gradually, and the water supply pressure is enhanced until the simulation of water inrush and mud inrush occurs, and the test is stopped, the output data of the monitoring components are recorded throughout the test in real time, after the test is over, the simulation test system is disassembled, the injected medium is cut, and the distribution of slurry veins is observed directly in different sections, and then the test data is analyzed, the reinforcement effects of slurry on weak strata are recorded and summarized under high temperature three-dimensional confining pressure and water pressure controllable gradient loadings.

16. The model test device according to claim 2, wherein an arched cover is provided outside the arched excavation chamber, and the arched covers connect with each other by bolts, during the grouting process, the bolts are buried in the soil arched cover to play a sealing role, during the excavation process, the arched cover is removed and the arched excavation limit plate is placed, the arched excavation limiting plate is a welded arched steel plate.

17. The model test device according to claim 16, wherein the connecting steel parts are formed by two vertically welding steel plates, and a fixed connecting piece with a plurality of triangular ribs arranged along the length direction evenly.

18. The model test device according to claim 2, wherein the connecting steel parts are formed by two vertically welding steel plates, and a fixed connecting piece with a plurality of triangular ribs arranged along the length direction evenly.

19. A model test method for curtain grouting and excavation of tunnels in high-temperature, water-rich and weak strata, wherein the method uses the model test device according to claim 2 to carry out the test method comprising the following steps:
   (1) before the test is carried out, the test is designed firstly, and the positions of the monitoring components in the soil and the weak stratum simulation system is replaced according to actual needs and conditions before use,
   (2) before the medium is injected, the hydraulic cylinders with the loading plate are hollowed out inside of each grid surface through the steel frame, and then the weak strata simulation system except the top steel frame is assembled according to the demands, and the PVC films is placed in the test space within the weak strata simulation system to prevent water seepage in the connection gap,
   (3) the monitoring elements are arranged promptly during the injection process of the medium, stainless-steel heating rods, temperature sensors, strata pressure sensors, displacement sensors, and stress sensors are buried in advance according to the preset plan, the monitoring and data acquisition system is debugged promptly, the stainless-steel heating rods constitute the high-temperature simulation system, and then the water pressure simulation system is installed,
   (4) after the injected medium is filled completely and the test equipment is assembled and connected, a hydraulic test is carried out firstly to check whether there are obvious gaps between the entire device and the connection positions of various places, so as to ensure that hidden dangers is checked in time and ensure that the later tests are carried out normally, data such as seepage velocity and pressure field in the medium is obtained before grouting,
   (5) after the hydraulic test is completed, start the stainless-steel heating rods before loading the ground stress every time, and then turn off the power supply of the stainless-steel heating rods after reaching the specified temperature, afterwards, three-dimensional confining pressure loads are applied according to the designed ground stress, and the temperature field and stress field at key positions are recorded in real time, which is in order to verify whether the confining pressure loading complies with the expected requirements of the test, during the loading process of confining pressure, it should be confirmed that the power supply of the stainless-steel heating rod is turned off,
   (6) the curtain grouting system connects to the grouting hole of the weak strata simulation system for the grouting test, during the grouting process, the parameters of the high geothermal simulation system, water pressure simulation system, and three-dimensional confining pressure simulation system are kept stable, and the output data of the monitoring components are paid attention to and recorded in time, during the grouting process, a multi-stage grouting test is carried out, after each stage of the grouting test, the arched cover is opened after the output data of each monitoring element remains stable, and the excavation limit plate is placed to guide the excavation, during the excavation process, the excavation distance and the output data of the monitoring and data acquisition system are recorded continuously, when the output data of the monitoring components is stable, the hydraulic gelling grouting material can be injected again in the excavation section of the tunnel, after excavation, the tunnel vault, side walls, tunnel face, etc. are reinforced by grouting, and the above steps of grouting and excavation shall be repeated again, and the impact of the subsequent excavation process on the previous reinforcement section shall be recorded,
   (7) after the entire tunnel excavation is completed, the continuous and stable three-dimensional loading of the three-dimensional confining pressure simulation system is maintained, and the output flow rate of the water pressure simulation system is increased gradually, and the water supply pressure is enhanced until the simulation of water inrush and mud inrush occurs, and the test is stopped, the output data of the monitoring components are recorded throughout the test in real time,
   after the test is over, the simulation test system is disassembled, the injected medium is cut, and the distribution of slurry veins is observed directly in different sections, and then the test data is analyzed, the reinforcement effects of slurry on weak strata are recorded and summarized under high temperature three-dimensional confining pressure and water pressure controllable gradient loadings.

20. A model test method for curtain grouting and excavation of tunnels in high-temperature, water-rich and weak strata, wherein the method uses the model test device according to claim 1 to carry out the test method comprising the following steps:
   (1) before the test is carried out, the test is designed firstly, and the positions of the monitoring components in the soil and the weak stratum simulation system is replaced according to actual needs and conditions before use,
   (2) before the medium is injected, the hydraulic cylinders with the loading plate are hollowed out inside of each grid surface through the steel frame, and then the weak strata simulation system except the top steel frame is assembled according to the demands, and the PVC films is placed in the test space within the weak strata simulation system to prevent water seepage in the connection gap,
   (3) the monitoring elements are arranged promptly during the injection process of the medium, stainless-steel heating rods, temperature sensors, strata pressure sensors, displacement sensors, and stress sensors are buried in advance according to the preset plan, the monitoring and data acquisition system is debugged promptly, the stainless-steel heating rods constitute the high-temperature simulation system, and then the water pressure simulation system is installed,
   (4) after the injected medium is filled completely and the test equipment is assembled and connected, a hydraulic test is carried out firstly to check whether there are obvious gaps between the entire device and the connection positions of various places, so as to ensure that hidden danger is checked in time and ensure that the later tests are carried out normally, data such as seepage velocity and pressure field in the medium is obtained before grouting,
   (5) after the hydraulic test is completed, start the stainless-steel heating rods before loading the ground stress every time, and then turn off the power supply of the stainless-steel heating rods after reaching the specified temperature, afterwards, three-dimensional confining pressure loads are applied according to the designed ground stress, and the temperature field and stress field at key positions are recorded in real time, which is in order to verify whether the confining pressure loading complies with the expected requirements of the test, during the loading process of confining pressure, it should be confirmed that the power supply of the stainless-steel heating rod is turned off, (6) the curtain grouting system connects to the grouting hole of the weak strata simulation system for the grouting test, during the grouting process, the parameters of the high geothermal simulation system, water pressure simulation system, and three-dimensional confining pressure simulation system are kept stable, and the output data of the monitoring components are paid attention to and recorded in time, during the grouting process, a multi-stage grouting test is carried out, after each stage of the grouting test, the arched cover is opened after the output data of each monitoring element remains stable, and the excavation limit plate is placed to guide the excavation, during the excavation process, the excavation distance and the output data of the monitoring and data acquisition system are recorded continuously, when the output data of the monitoring components is stable, the hydraulic gelling grouting material can be injected again in the excavation section of the tunnel, after excavation, the tunnel vault, side walls, tunnel face, etc. are reinforced by grouting, and the above steps of grouting and excavation shall be repeated again, and the impact of the subsequent excavation process on the previous reinforcement section shall be recorded, (7) after the entire tunnel excavation is completed, the continuous and stable three-dimensional loading of the three-dimensional confining pressure simulation system is maintained, and the output flow rate of the water pressure simulation system is increased gradually, and the water supply pressure is enhanced until the simulation of water inrush and mud inrush occurs, and the test is stopped, the output data of the monitoring components are recorded throughout the test in real time, after the test is over, the simulation test system is disassembled, the injected medium is cut, and the distribution of slurry veins is observed directly in different sections, and then the test data is analyzed, the reinforcement effects of slurry on weak strata are recorded and summarized under high temperature three-dimensional confining pressure and water pressure controllable gradient loadings.

\* \* \* \* \*